F. A. MORGAN.
INDICATING AND RECORDING DEVICE.
APPLICATION FILED MAR. 22, 1909.

940,888.

Patented Nov. 23, 1909.
6 SHEETS—SHEET 1.

WITNESSES:
J. H. Swan.
Cora Johnson.

INVENTOR
Frederick A. Morgan
BY
Thompson & Bell
ATTORNEY

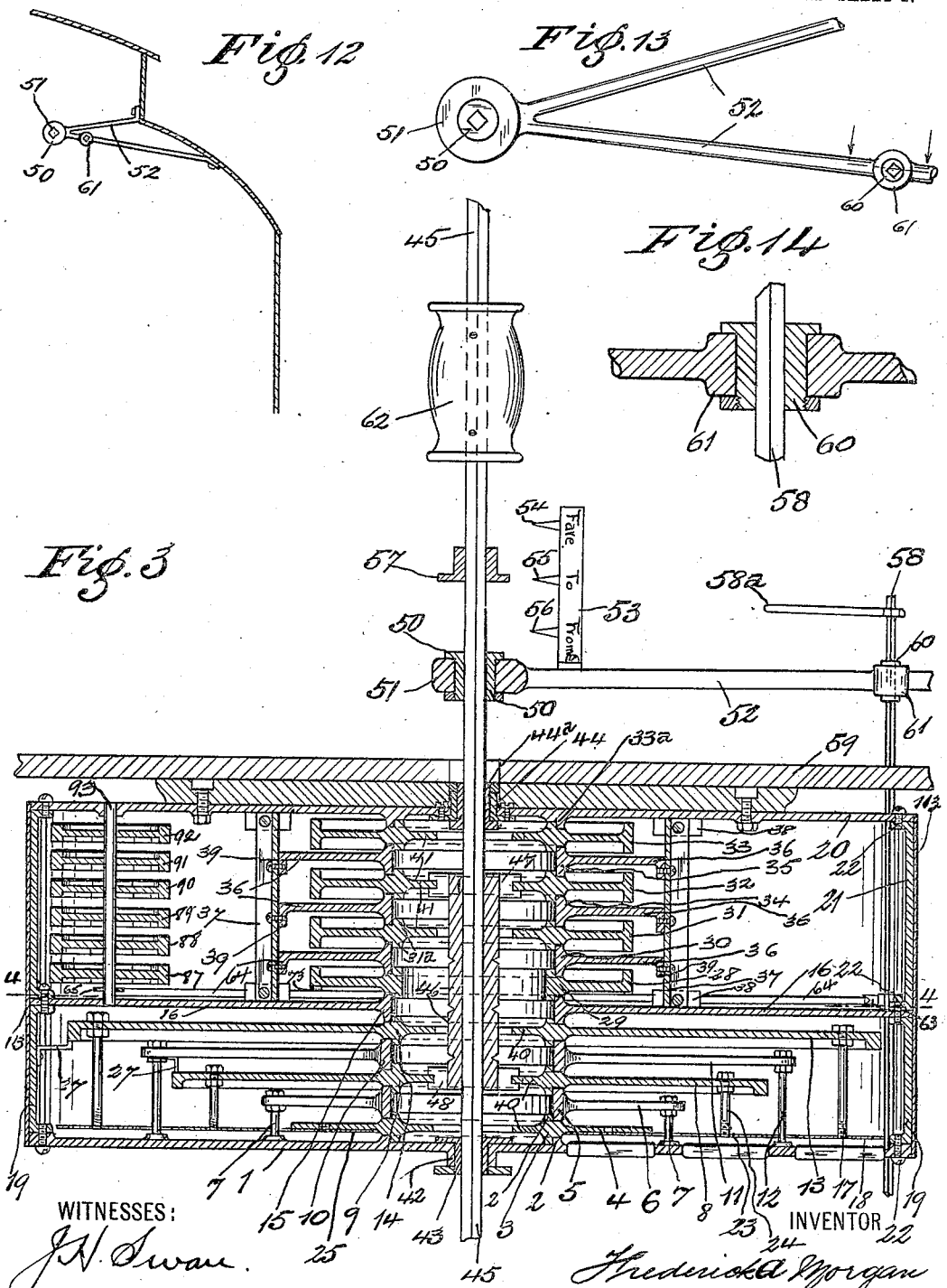

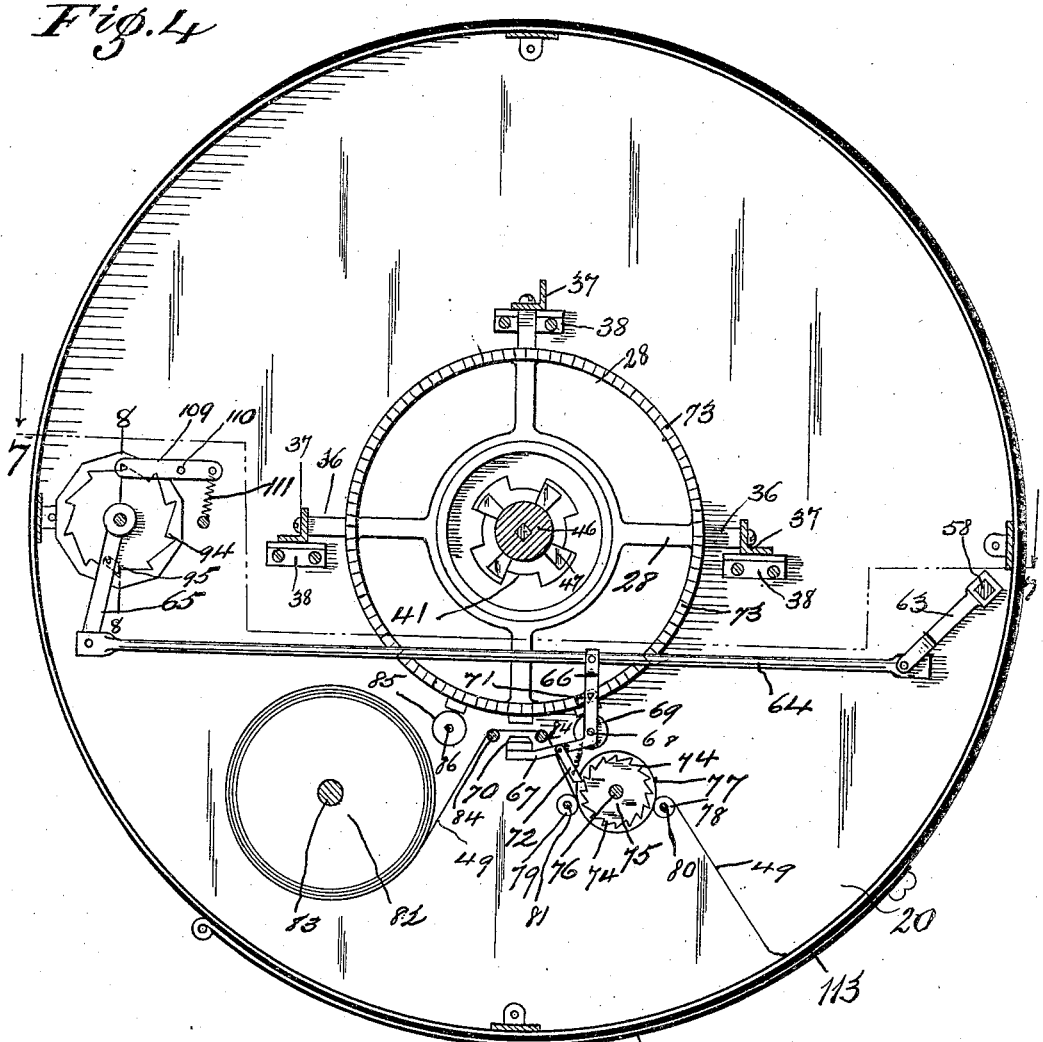
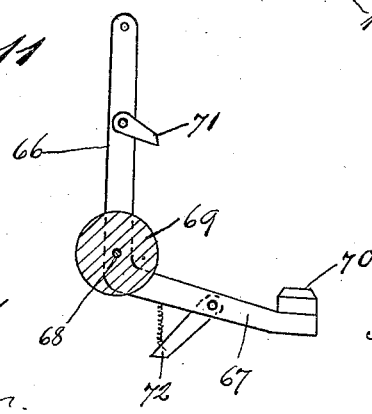

F. A. MORGAN.
INDICATING AND RECORDING DEVICE.
APPLICATION FILED MAR. 22, 1909.

940,888.

Patented Nov. 23, 1909.
6 SHEETS—SHEET 4.

WITNESSES:
JH Swan.
Cora Johnson.

INVENTOR
Frederick A Morgan
BY
Thompson P Bee
ATTORNEY

F. A. MORGAN.
INDICATING AND RECORDING DEVICE.
APPLICATION FILED MAR. 22, 1909.
940,888.
Patented Nov. 23, 1909.
6 SHEETS—SHEET 5.
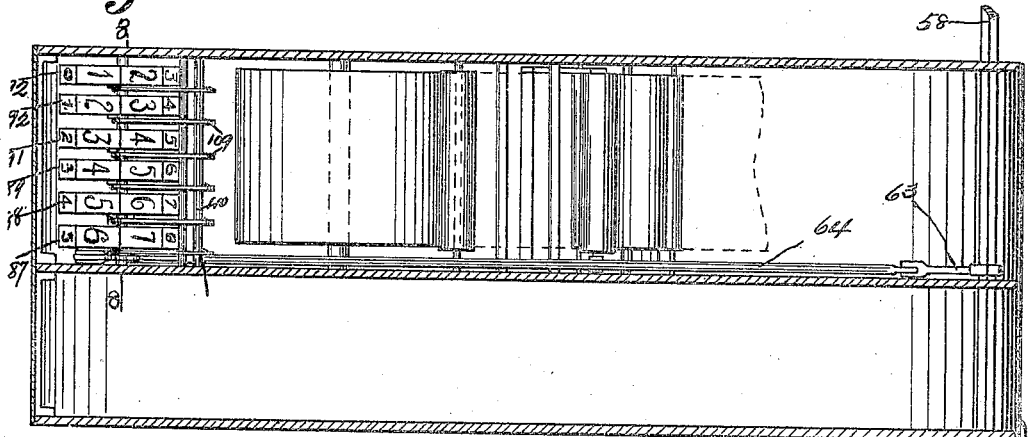
WITNESSES:
J. H. Swan.
Cora Johnson.
INVENTOR
Frederick A. Morgan
BY
Thompson & Bell
ATTORNEY

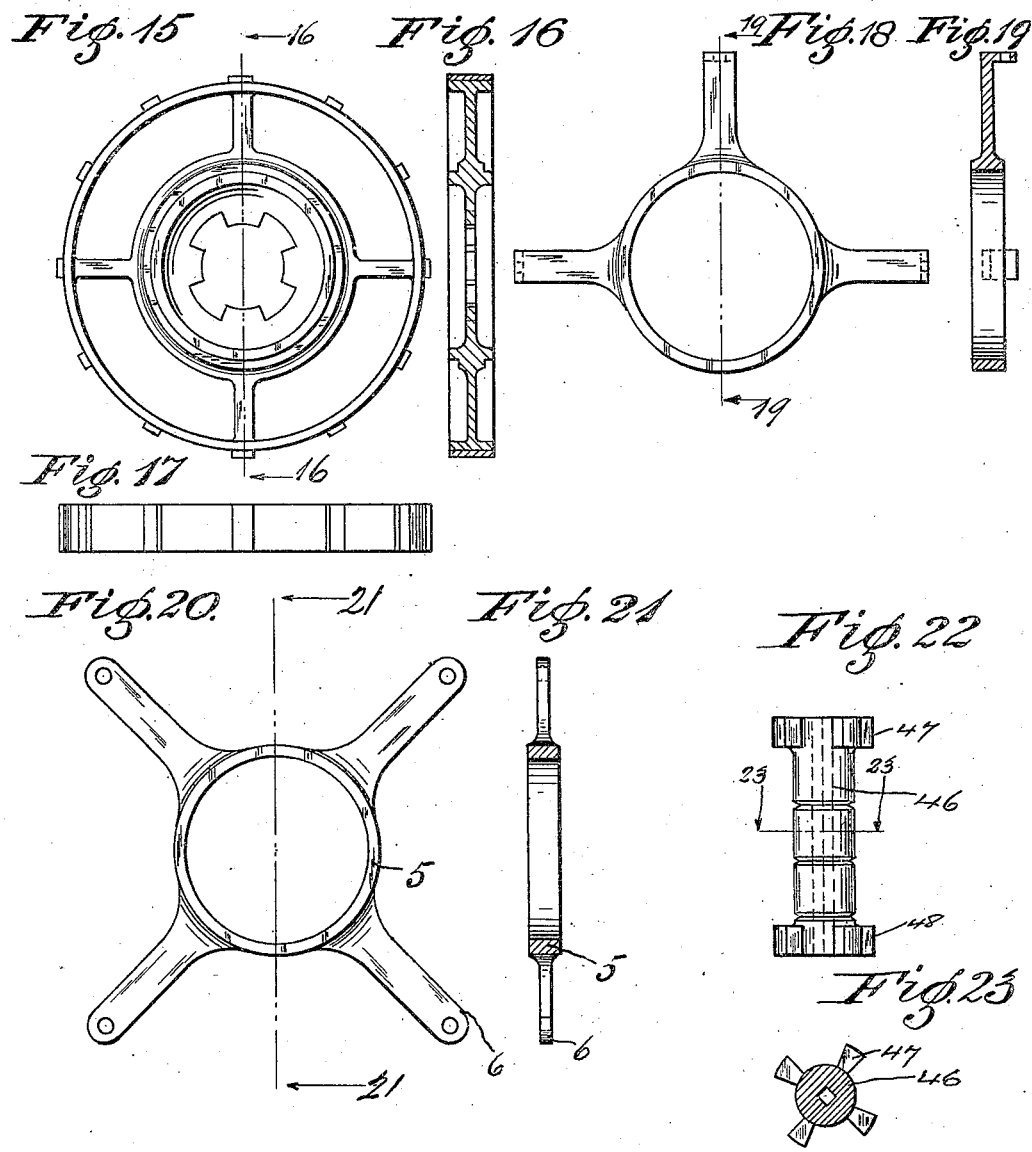

UNITED STATES PATENT OFFICE.

FREDERICK A. MORGAN, OF INDIANAPOLIS, INDIANA, ASSIGNOR TO MORGAN FARE REGISTER COMPANY, OF INDIANAPOLIS, INDIANA, A CORPORATION OF INDIANA.

INDICATING AND RECORDING DEVICE.

940,888.  Specification of Letters Patent.  Patented Nov. 23, 1909.

Application filed March 22, 1909. Serial No. 484,971.

*To all whom it may concern:*

Be it known that I, FREDERICK A. MORGAN, citizen of the United States, residing at Indianapolis, in the county of Marion and State of Indiana, have invented certain new and useful Improvements in Indicating and Recording Devices, of which the following is a specification, reference being had therein to the accompanying drawing.

This invention relates to an improved fare registering and recording mechanism for use in connection with interurban cars as hereinafter described in the specification and particularly pointed out in the claims.

The object of this invention is to construct a combined recording and indicating machine for use in interurban cars whereby the amount of the fares collected may be indicated, as collected, and in view of the passengers, and simultaneously recorded; and, to provide means whereby the record of the fares thus collected during the trip may be removed at the end of the trip to be copied into the record books in the office department of the railroad. I attain these objects by means of the apparatus illustrated in the accompanying drawings in which like numerals of reference designate like parts throughout the several views.

Figure 1:
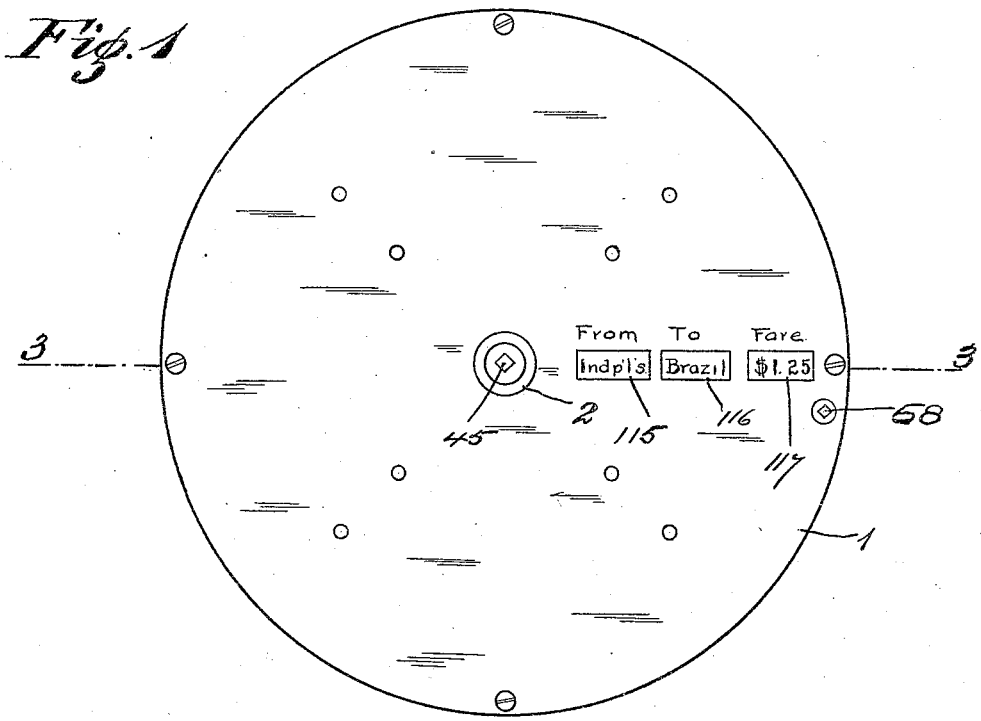
Figure 2:
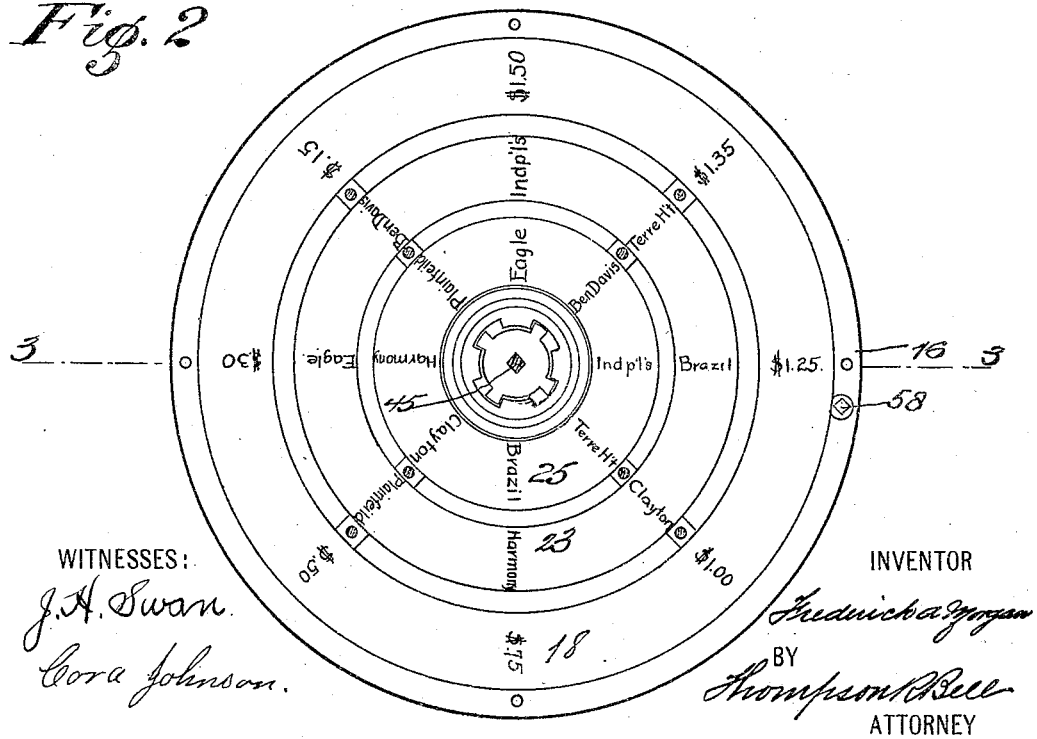
Figure 5:
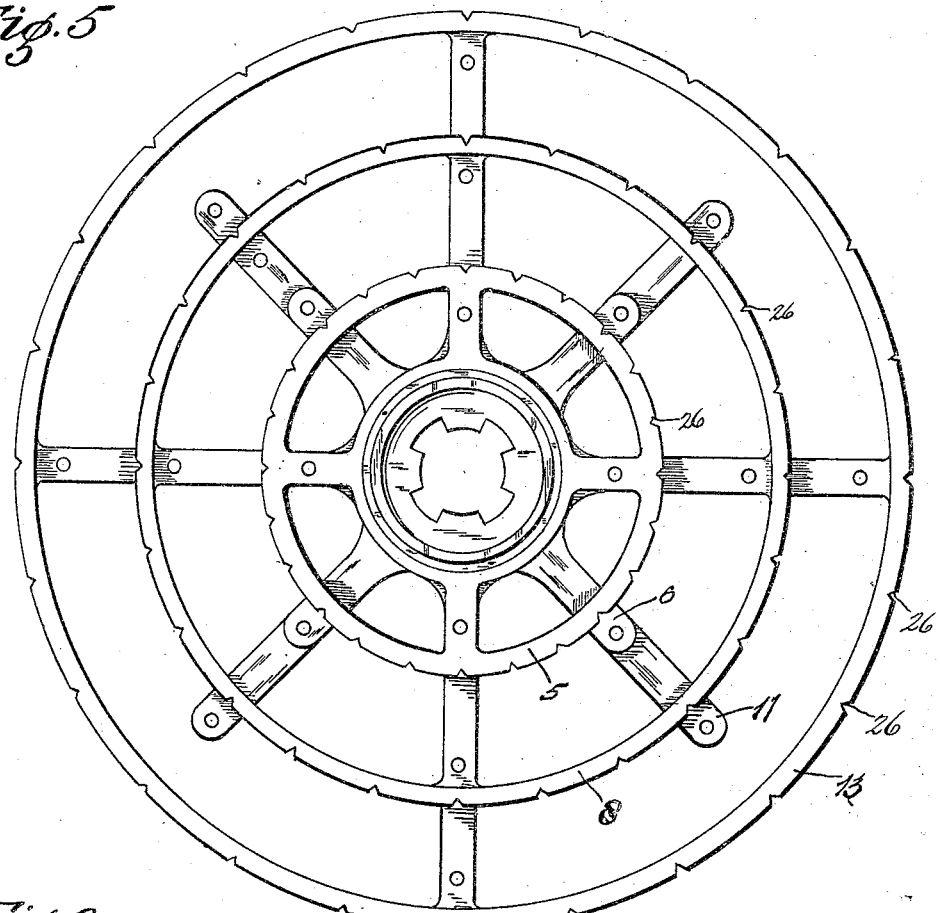
Figure 6:
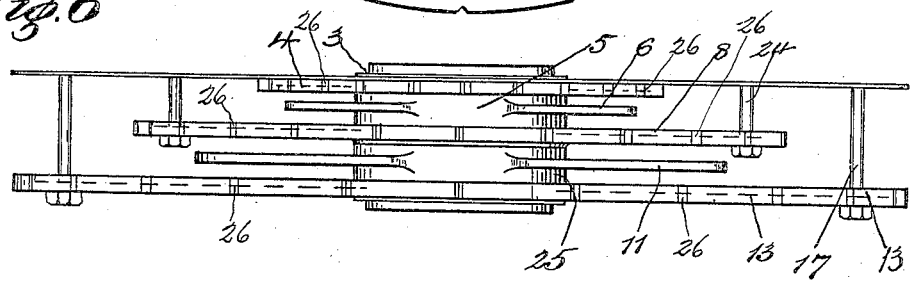

Figure 1 is a front view of the apparatus showing the face of the indicator; Fig. 2 is a front view of the apparatus showing the face removed to expose the concentric indicator disks of the apparatus; Fig. 3 is a horizontal sectional view of the apparatus taken along the line 3—3 in Figs. 1, 2, and 4; Fig. 4 is a vertical sectional view of the apparatus taken along the line 4—4 in Fig. 3; Fig. 5 is an enlarged detail view of the indicating disk carrying wheels showing the indicating disks removed; Fig. 6 is a top view of the same showing the indicating disks attached to said wheels; Fig. 7 is a horizontal sectional view of the apparatus showing the printing or counting mechanism, and the dial wheels of the indicating mechanism removed and taken along the line 7—7 in Fig. 4. Fig. 8 is an enlarged sectional detail view of the counting wheels and the pawl mechanism by which they are operated; and taken along the line 8—8 in Figs. 4 and 7; Fig. 9 is a side view of the same; Fig. 10 is a detail view of the opposite side of one of the counting wheels showing the single detent of the counter wheel; Fig. 11 is an enlarged detail view of the platen carrying and pawl carrying arms of the recording mechanism; Fig. 12 is a detail view of the indicator-shaft carrying arm; Fig. 13 is an enlarged broken view of a portion of the same; Fig. 14 is a broken detail sectional view of the inner bushing and the bearing of said arm; Fig. 15 is a detail side view of one of the printing or recording wheels; Fig. 16 is a section of the same taken along the line 16—16 in Fig. 15; Fig. 17 is an edge or top view of said wheel; Fig. 18 is a detail enlarged view of one of the bearing hangers for carrying the type wheels; Fig. 19 is a sectional view of the same taken along the line 19—19 in Fig. 18; Fig. 20 is a detail enlarged view of one of the bearing hangers for carrying the indicating wheels; Fig. 21 is a sectional view of the same taken along the line 21—21 in Fig. 20; Fig. 22 is an enlarged side view of the key whereby the indicating and recording or printing wheels are connected in pairs set simultaneously; and, Fig. 23 is a sectional view of the same taken along the line 23—23 in Fig. 22.

Situated centrally on the surface of the disk 1, back of the face thereof, is formed the bearing 2 into which the enlarged hub portion 3 of the dial wheel 4 is fitted to turn and on the opposite side of said wheel is formed the hub 2 which is turned to fit in the bore of the bearing 5, so that said dial wheel 4 is supported at both sides and securely held in its central position. The bearing 5 is provided with the hanger arms 6 which extend radially from the bearing 5 to a point beyond the periphery of the dial wheel 4 so that the distance studs 7 may extend from said arms 6 to the disk 1 to maintain the said bearing in its fixed central position. The dial wheel 8 is provided with the central hub 9 similar to the hub 3 which projects on both sides of the hub of said dial wheel 8 and is turned truly at its projecting ends to fit into the bores of the bearings 5 and 10 to be rotated therein, and the said bearing 10 is provided with the arms 11 which are similar to the arms 6 of the bearings 5 and extend beyond the periphery of the wheel 8 and said arms are provided with supporting studs 12 whereby the bearing 10 is maintained firmly in position opposite the bearing 5. The larger dial wheel 13 is provided with the hub 14 which projects on both sides of the web of the dial wheel 13 and is turned truly to fit and to be rotated in the bearing 10, and the bearing 15 formed on the intermediate casing 16 of the indicator and said bearings 10 and 15 are of equal diameters of bore to fit and receive the opposing equal projecting turned trunnion ends of the hub 14 of the indicator wheel 13 to freely turn therein. The indicator carrying wheel 13 is provided with the distance studs 17 which extend from said wheel 13 to the disks 18 to support and to revolve the latter with the said wheel. The intermediate casing 16 is connected to the disk face 1 by the distance bars 19 and the inclosing casing 20 of this apparatus is held in position relatively to said intermediate casing 16 by the distance bars 21 which bars are connected at their ends to said intermediate casing 16 and the casing 20 by the screws 22. The outer indicating disk 18 has the values or fares designated on its face as shown particularly in Figs. 1 and 2 of the drawings, and revolves with its carrying wheel 13 to which it is connected, as previously described, and the intermediate indicating dial 23 upon the face of which the names of the way stations or stopping points at which a passenger leaves the car or the destinations of the passenger are designated revolves with its carrying wheels 8 to which it is connected by the supporting studs 24 and the central disk 25 upon the face of which the names of the way stations or the station at which a passenger enters the car, and consequently the station from which he pays his fare, are designated and said indicator disk is directly connected to the web portion of the dial carrying wheel 4, and thus the place from which and to which a passenger travels, or his destination, and the fare for same are clearly indicated and the record of such passage and cost of transportation of same are clearly recorded by the mechanism hereinafter described.

The disk carrying wheels 4, 8, and 13 are each provided with notches 26 into which the stop springs 27 are adapted to move to engage in said notches to yieldingly retain said wheels from revolving and said notches are situated spaced apart in the periphery of each of said wheels so that a notch will be situated on a radial line with the line of the station or fare designated on the face of the disk carried by it, so that when the said disks are rotated into the position shown in Fig. 1 to indicate "From Indianapolis to Brazil, fare $1.25." The stop springs 27 will each move into that notch situated in relative radial position to the line of conlination of the names designated on the several disks, to yieldingly retain said disk carrying wheels and the disks carried by them in rotative position, so that said indicating disks will not readily move when vibrated by the jolting of the car and cannot be rotated unless by the operator provided with a suitable key. The unit number print wheel 28 is provided with the hub 29 which projects from the opposing sides of the web of said wheel and said hub is turned truly on its peripheral projecting ends to fit into the bearing 15 situated at one side of said wheel and the bearing 30 situated at the other side of said wheel and both of which bearings are of equal diameters of bore and the said wheel 28 is almost similar to the wheels 31, 32, and 33 except that the rim thereof instead of being equally divided on each side of the web, as in the wheels 31, 32, and 33, is situated at one side of its web. The type-wheel 31 is provided with the central hub 31ª which projects equally on both sides of the web of said type wheel 31 and said hub is turned truly at its peripheral projecting ends one end to fit into the bores of the bearings 30 the other to fit in the bore of the bearing 34 to be freely rotated therein. The type wheel 32 is similar to that of the type wheel 31 and is supported to be revolved in like manner in similar bearings. The type wheel 33 is similar in construction and form to the type wheels 31 and 32 and the hubs are alike and the hub of said type wheel 33 is turned truly at its ends, the one end to fit and to turn in the bore of the bearings 35, the other to fit and turn in the bearing 33ª formed centrally on the closure casing 20 to project from the surface thereof.

The bearing 34 situated between the type-wheels 31, 32 and the bearing 35 situated between the type-wheels 32 and 33, are similar in every respect to the bearing 30 and each of said bearings 30, 34, and 35 are provided with supporting arms 36 which are secured to the angle irons 37 carried by the angle iron brackets 38 secured to the intermediate casing 16 and the closing casing or back 20. The feet 39, of each of the arms 36, are securely bolted to the supporting angle irons 37 and the upper angle irons 37. Each of said angle irons 37 rests upon and is secured to the angle iron brackets 38 which latter are secured by suitable screws to the end casing 20 and the intermediate casing 16 of the machine, so that the bearings 30, 34, and 35 are securely maintained in alinement with each other, and the printing wheels will turn freely in said bearings. In each of the central portions of the dial carrying wheels 4, 8, and 13 are formed the internal teeth 40 and centrally in the hubs of said printing wheels and central with said dial carrying wheels, are formed similar teeth 41 and the central opening in each of the hubs are alike and equal in size and adapted to receive the trunnion key 46. Formed central on the center of the dial face 1 is the bearing 42 which is situated centrally with the axis of the said dial wheels and printing wheels which are both on the same axis center, and in said journal is a bushing 43 which is turned to fit in said bearing 42 to freely turn therein. In the rear casing 20 is secured centrally the bearing 44 which is situated directly opposite and in alinement with the bearing 43 and the said bearing 43 is bored to receive the bushing 44ª which fits accurately and turns freely therein. Centrally in said bushings 43 and 44 are formed longitudinal square bores into which the square shaft 45 is fitted to slide longitudinally therein and to turn therewith, and on this shaft is secured the key 46 to be turned therewith. The key 46 is provided with the end teeth 47 and 48 both of which are alike and situated in like positions relatively to each other around the periphery of said key 46 and said key is provided with a longitudinally extending bore adapted to fit said shaft 45 and is secured thereto to turn therewith, so that when the said shaft is moved longitudinally to change the position of the key, the teeth 47 thereof will engage one of the series of the dial carrying wheels, and the teeth 48 will simultaneously engage one of the teeth of the series of corresponding printing wheels, so that a dial wheel and the printing wheel are engaged simultaneously and in corresponding pairs and the amount of fare and the place from which the passenger is going and to which he is going or the name of the place of his destination, is indicated on the dial and simultaneously recorded by the printing wheels on the continuous record sheet of paper 49.

The indicator is situated centrally or nearly so of the top portion of the car, so as to be in full view of every passenger in the car and the indicator shaft 45 thereof may extend both forwardly and rearwardly of the indicator, rearwardly of the indicator in the regular passenger department, and forwardly of the indicator to project into the smoking compartment of the car which is usually situated at the front portion of the car. At suitable intervals apart along the indicator shaft 45 are situated suitable bushings 50 which are each provided with square holes into which said shaft is adapted to fit to freely slide therein and the said bushings 50 are turned on their outer peripheries to fit into the bearings 51 and turn freely therein and said bearing is carried by the arms 52 extending from the side top portion of the car. A gage 53 is secured to extend from the side of one of said arms 52, see Fig. 3, parallel to the shaft 45, and on the face of said gage is printed or engraved the words "Fare", "To" and "From" and projecting from the side of said gage are the pointers 54, 55, and 56. A collar 57 is secured in such position on the shaft 45, so that when the latter is moved longitudinally till the flange of the collar 57 is situated directly opposite the pointer 56, the teeth 48 of the key 46 engage the teeth 40 of the disk carrying wheel 4 and the teeth 47 of said key will simultaneously engage the teeth 41 of the type wheel 31 which wheel corresponds to the inner central dial 25 and has type arranged on its peripheral face corresponding to the name on the face of the central dial 25, so that when the inner central dial 25 is rotated till the name of the station at which a passenger enters the car appears before the aperture 115 in the dial plate 1, as the word "Indianapolis", the type wheel 31 will be rotated till the type spelling "Indianapolis" is revolved in position over the record paper 49 to be printed on said paper, and, thus as each dial is set, a type wheel corresponding to said dial is set and the name or word indicated on the dial is recorded on the record paper 49 by the type wheel corresponding to said dial which printing mechanism I will now proceed to describe.

A secondary or fare registering shaft 58 extends through the right hand lower portion of the indicator and register to project beyond the front face of the indicator and longitudinally along the top portion of the car in parallel relation with the shaft 45 and the forward end portion of said shaft 58 extends forwardly through the partition 59 through the bushing 60 which bushing is turned to fit and freely turn in its bearing 61 formed in the lower arm 52 by which bearing said shaft 58 is supported and carried at intervals along its length. The arms 52 are spaced at intervals along said shaft 58 and secured in position to the car so that the shaft is easily accessible to a conductor when a fare is required to be rung up and registered. On the shaft 45 hand grips 62 are secured on said shaft 45 at suitable intervals apart, and the same are provided for the purpose of turning and moving said shaft longitudinally to set the same to the position required to turn the dials and type wheels simultaneously to indicate and record a fare and the place from which a passenger is going and the destination. On the shaft 58, and situated to operate in the rear compartment of the indicator, is the arm 63 to the lower depending end of which one end of the connecting rod 64 is connected and to the other end of said connecting rod 64 is connected the depending pawl carrying-arm 65 of the counting mechanism. The bell crank pawl carrying lever is composed of the vertically extending lever arm 66 and the horizontally extending arm 67, and said bell-crank lever is pivotally mounted on one end of the arbor 68 of the inking roller 69, and to the top end of the vertically extending arm 66 is pivotally connected the connecting-rod 64 at a point intermediate the end of the latter and the horizontally extending arm 67 is provided with the platen 70 the top flat surface of which is situated in parallel relation to the face of the type wheels 28, 31, 32, and 33, and said platen is adapted to strike the paper 49 with every reciprocation of the connecting rod 64 to press said platen against the recording paper and the recording paper against the type of the series of type wheels to receive an impression from each simultaneously and on a straight line to extend transversely of the record paper 49 to read from left to right.

On the arms 66 and 67 of the bell-crank lever are pivoted the pawls 71 and 72. The pawl 71, which is pivotally connected on the vertically extending arm 66, is adapted to alternately engage the ratchet teeth 73 of the unit number wheels 28 and the pawl 72, carried by and pivotally connected on the horizontally extending lever arm 67, is adapted to alternately engage the teeth 74 of the ratchet wheel 75 secured on one end of the arbor 76 of the paper feed roller 77 to rotate the latter. The periphery of the roller 77 is adapted to contact and slightly press against the peripheries of the parallel rollers 78 and 79 and said rollers have the ends of their arbors 80 and 81 adapted to fit in suitable bearings formed in the partition 16 and the end closure casing 20 to freely turn therein. The paper roller 82 upon which the paper 49 is rolled is provided with the arbor 83 which latter is also supported in suitable bearings formed in the partition casing 16 and the closure casing 20. The paper guiding rollers 84 maintain the paper 49 in horizontal position under the peripheral surfaces of the type wheels 31, 32 and 33, and the said rollers are sufficiently far apart so that the platen 70 will freely pass between them and move the paper 49 upwardly toward the type of said type-wheels to receive an impression therefrom. The inking rollers 85 and 69 are situated one on each side of the vertical center line of the type wheels 28, 31, 32 and 33 in position to contact with the type thereof, so that if the type wheels are revolved in either a right or left hand direction either one of the rollers 69 or 85 will operate to ink the type before reaching its vertical position over the paper 49 to print on it, and said inking rollers 85 and 69 are provided with the arbors 68 and 86 the ends of which are journaled in suitable bearings formed in the partition casing 16 and the closure casing 20 to turn freely therein. At intervals along the shaft 58 are secured hand levers 58ª and said levers are provided and so arranged along said shaft as to be conveniently reached by the conductor to ring up or record a fare collected by him.

The counting mechanism may be of any suitable type of well-known counting mechanism, but I have adopted the mechanism shown particularly in Figs. 4, 8, 9 and 10 as the best adapted for use in connection with my fare indicating and recording mechanism and which I will now proceed to describe:—This mechanism consists of a series of counter wheels each arranged side by side, as the wheels 87, 88, 89, 90, 91 and 92 which are mounted on a common arbor 93 which arbor is supported at its ends in suitable bearings formed in the partition casing 16 and the closure casing 20. Each of said counting wheels are alike in form and construction, so that a description of the unit wheel 87 will suffice for all. This wheel is in the form of a decagon or is ten sided and on these sides are marked in rotation the numerals 1 to 0 inclusive, as shown in Fig. 7, each wheel is provided alike with the internal detents 94 on one side which detents are ten in number corresponding with the peripheral sides of the wheel, which are also ten in number, and said detents are adapted to be alternately engaged by the feed pawl 95 carried by the depending arm 65 so that for each vibration of the arm 65 the counter wheel 87 is moved one tooth or the tenth part of a revolution. On the opposite side of the web of the counter wheel 87 is formed a single detent 96 which is adapted to be engaged by one side of the double pawl 97 which is pivotally mounted on the depending vibration pawl carrying arm 98 and the remaining counter wheels 88, 89, 90, 91 and 92 are alike and similar to the unit counter wheel 87 and said wheels are operated by the depending pawl carrying arms 99, 100, 101, 102 and 103 which carry the pawls 104, 105, 106 and 107 and said pawl carrying arms 65, 98 to 103 inclusive are connected to swing simultaneously by the tie rod 108 which rigidly secures said arms in alinement. The pawl levers 109 are situated one between each pair of counter wheels, and said levers are alike in construction and are mounted on the shaft 110 secured at its ends in the partition 16 and the closure casing 20 and each of said levers is provided with a coil spring 111 whereby its pawl 112 is yieldingly maintained in gear with a detent of a counter wheel. A further description of these counting wheels is unnecessary, as the construction and operation of this and other various types of counting wheel mechanism is well-known to those skilled in the art and could be readily applied by them.

This fare indicator and register is preferably constructed of a cylindrical form and the mechanism is inclosed by the outer cylindrical casing 113 which is suitably secured to distance bars 19. A door 114 is provided in said casing and is situated under the paper printing mechanism and said door is provided for the purpose of gaining access to the interior of the recording mechanism and for removing the printed paper recorded when such is necessary.

The practice of this invention I will now proceed to describe:—Suppose it is desired to indicate a trip from Indianapolis to Brazil and the fare of $1.25. To do this the operator first moves the setting shaft 43 longitudinally till the teeth 48 of the key 46 engage the internal teeth 40 of the disk carrying wheel 4 and the teeth 47 of said key 46 simultaneously engage the internal teeth 41 of the corresponding type wheel 31. The operator then rotates the shaft 45 to simultaneously rotate the disk carrying wheel 4 and the type wheel 31 till the word "Indianapolis" appears through the aperture 115 in the disk 1. This done the operator next moves the shaft 45 longitudinally till the teeth 48 of the key 46 engage the internal teeth of the disk carrying wheel 8 and the teeth 47 of said key 46 simultaneously engage the internal teeth 41 of the corresponding type wheel 32. The operator again rotates the shaft 45 to simultaneously rotate the disk carrying wheel 8 and the type wheel till the word "Brazil" appears through the aperture 116 and similarly the disk carrying wheel 13 and the type wheel 33 are operated to be set till the amount of fare, namely $1.25 is exhibited through the aperture 117. The operator now takes hold of one of the lever arms 58ª on the shaft 58 to partially rotate the counter mechanism operating shaft 58 to simultaneously operate the arms 66 and 67 of the bell-crank lever and the depending arms 65, 99, 100, 101, 102 and 103 of the counter mechanism to record the number of fare. The connecting rod 64 on moving forwardly or in the direction of the arrow a, moves the end of the arm 67 upwardly to cause the platen 70 to strike that portion of the paper 49 situated between the paper guiding rollers 84 to force the surface of said paper 49 against the type secured on the peripheral faces of the printing wheels 28, 31, 32 and 33 to make a printed record of the stations and fare on the paper as indicated on the disk 1. When the operator next rotates the shaft 58 to move the connecting rod 64 and simultaneously rotates the arms 66 and 67 of the bell-crank lever, the pawls 71 and 72 thereof operate to rotate the wheel 28 and the paper roller 77 the former to place the next succeeding type number in position on the type wheel 28 for a new line on the record paper and the latter to introduce a clean unprinted portion of the record paper to be printed upon it and so on, continuously as the destinations of the passengers and the fares collected and indicated are recorded on the record paper 49.

I claim:

1. In an indicating and recording device, the combination with a series of indicating disks, a series of disk carrying wheels by which said disks are carried, and a series of type printing wheels arranged in a row and situated back of said disk carrying wheels, of means for engaging one of each of the series of said disk carrying and type wheels whereby an indicator disk and a corresponding type wheel may be engaged to be simultaneously rotated to be set.

2. In an indicating and recording device, the combination with a series of concentric indicating disks, a series of disk-carrying wheels by which said disks are carried and a series of type printing wheels arranged in a row and situated back of and in a line with said disk carrying wheels and on the same axle center, of a key adapted to engage one of each of the series of disk carrying and type wheels, whereby an indicator disk and a corresponding type wheel may be engaged to be simultaneously rotated to be set.

3. In an indicating and recording device, the combination with a series of concentric indicating disks situated in one plane, a series of disk-carrying wheels situated on the same axis of said indicating disks and back of the latter, a series of type printing wheels arranged in a row and situated back of and in line with said disk carrying wheels and on the same axial center, of a key adapted to engage one of each of the disk carrying and type wheels whereby an indicator disk and a corresponding type wheel may be engaged to be simultaneously rotated to be set.

4. In an indicating and recording device, the combination with a series of concentric station and fare indicating disks the faces of which are situated in one plane, a series of disk carrying wheels situated on the same axial center as said disks and back of the latter, means whereby a single indicating disk is connected to and carried by each of said disk carrying wheels, a series of type wheels arranged in a row and situated back of and on the same axial center as said disks and said disk carrying wheels, of a setting key adapted to engage one of each of said disk carrying and said type wheels whereby an indicating disk and a corresponding type wheel may be engaged simultaneously to be simultaneously rotated to be set.

5. In an indicating and recording device, the combination with a series of concentric station and fare indicating disks the faces of which are situated in one plane, a series of disk carrying wheels situated on the same axial center as said disks and back of the latter, means whereby a single indicating disk is connected to and carried by each of said disk carrying wheels, retaining springs engaging said disk carrying wheels whereby each is yieldingly retained in its set position, a series of type wheels arranged in a row and situated back of and on the same axial center as said disks and said disk carrying wheels, of a setting key adapted to engage one of each of said disk carrying and said type wheels whereby an indicating disk and a corresponding type wheel may be engaged simultaneously to be simultaneously rotated to be set.

6. In an indicating and recording device, the combination with a series of concentric indicating disks, a series of carrying wheels by which said disks are carried, and rotated, a series of type-printing wheels arranged in a row and situated back of said disk-carrying wheels, and means for engaging one of each of the series of said disk carrying and said type wheels whereby an indicating disk and a corresponding type wheel may be engaged to be simultaneously set, of a record paper situated under said type wheels, means for guiding said record paper and feeding it under said type wheel, means for inking the type of said wheels, and a platen adapted to be moved upwardly to press the record paper against the type of the type wheels.

7. In an indicating and recording device, the combination with a series of concentric indicating disks, a series of carrying wheels whereby said disks are carried and rotated, a series of type printing wheels arranged in a row and situated back of said disk-carrying wheels, and means for engaging one of each of the series of said disk-carrying and said type wheels whereby an indicating disk and a corresponding type wheel may be engaged to be simultaneously set, of a pair of record paper carrying and guiding rolls situated under said type wheels and parallel therewith, a record paper carried by said rolls, suitable type inking rollers situated under and in contact with said type wheels and parallel therewith, a platen situated to pass between said paper guide rollers to cause said record paper to contact with said type wheels, and a paper feed roller.

8. In an indicating and recording device, the combination with a series of concentric indicating disks, a series of carrying wheels whereby said disks are carried and rotated, a series of type printing wheels arranged in a row and situated back of said disk-carrying wheels, and means for engaging one of each of the series of said disk-carrying and said type wheels whereby an indicating disk and a corresponding type wheel may be engaged to be simultaneously set, of a pair of record paper carrying and guiding rolls situated under said type wheels and parallel therewith, a record paper carried by said rolls, suitable type inking rollers situated under and in contact with said type wheels and parallel therewith, a platen situated to pass between said paper guide rollers to cause said record paper to contact with said type wheels, a paper feed roller, a fare counting mechanism and suitable mechanism for operating said counting mechanism.

In testimony whereof I affix my signature in presence of two witnesses.

FREDERICK A. MORGAN.

Witnesses:
   THOMPSON R. BELL,
   S. A. MORGAN.